United States Patent
Scheps

(10) Patent No.: US 6,437,890 B1
(45) Date of Patent: Aug. 20, 2002

(54) LASER COMMUNICATIONS LINK

(75) Inventor: Richard Scheps, Rancho Santa Fe, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/280,644

(22) Filed: Mar. 29, 1999

(51) Int. Cl.[7] .................................................. H04B 10/00
(52) U.S. Cl. ....................... 359/141; 359/141; 359/155; 359/172; 359/179
(58) Field of Search ................................ 359/141, 155, 359/172, 179

(56) References Cited

U.S. PATENT DOCUMENTS

| | | | |
|---|---|---|---|
| 3,243,592 A | | 3/1966 | Tomiyasu et al. |
| 3,309,651 A | | 3/1967 | Epstein et al. |
| 4,021,661 A | * | 5/1977 | Levine |
| 4,995,101 A | * | 2/1991 | Titterton et al. |
| 5,038,406 A | * | 8/1991 | Titterton et al. |
| 5,444,441 A | * | 8/1995 | Sutton |
| 6,118,066 A | * | 9/2000 | Sirmalis et al. |

* cited by examiner

*Primary Examiner*—Leslie Pascal
*Assistant Examiner*—Dzung Tran
(74) *Attorney, Agent, or Firm*—Cella C. Dunham; James A. Ward; Peter A. Lipovsky

(57) ABSTRACT

A laser communications link provides a downlink laser beam having a wavelength suitable for transmission through water transmitted from an aircraft or satellite to a submerged vehicle. An uplink laser beam having a wavelength that is visually undetectable is conducted through the water from the submerged vehicle by an optical fiber and radiated from the optical fiber at the surface of the water to the aircraft or satellite.

5 Claims, 1 Drawing Sheet

LASER COMMUNICATIONS LINK

Background of the Invention

The present invention relates generally to laser communication systems. More specifically, but without limitation thereto, the present invention relates to a laser communications link between aircraft and underwater platforms.

The problem of communicating with unmanned undersea vehicles (UUV's) has received much attention in the prior art. UUV's may surface and communicate by radio in the same manner as surface vessels, but this manner of communication suffers from disadvantages such as interruption of a mission, increased vulnerability to weather and threat activity on the surface, and lack of communication when surfacing is not permissible.

Radio communication systems have been devised that permit some degree of communication with submerged vehicles and platforms such as UUV's, however these are sharply limited in their application because of attenuation of RF signals in water and also because they provide a means whereby eavesdroppers may locate and identify the transmissions made from the submerged vehicle.

Surface buoys connected by an electrical cable to a UUV have been used to permit the maintenance of a relatively safe depth, but these are also susceptible to surface detection.

Communication with a friendly aircraft over the area occupied by a submerged vehicle or with an orbiting satellite is possible using the highly directive properties of modulated light beams. The energy of such beams does not generally disperse beyond the immediate location, thereby improving the security of the communications link. A laser beam also has the capability of penetrating sea water to some degree, particularly in the blue-green wavelengths. However, the high visibility of a blue-green laser from the air compromises the security of the submerged vehicle.

A need therefore continues to exist for a laser communications device for submerged platforms with aircraft and orbiting satellites.

SUMMARY OF THE INVENTION

The present invention is directed to overcoming the problems described above, and may provide further related advantages. No embodiment of the present invention described herein shall preclude other embodiments or advantages that may exist or become obvious to those skilled in the art.

A laser communications link of the present invention provides a downlink laser beam having a wavelength suitable for transmission through water transmitted from an aircraft or satellite to a submerged vehicle. An uplink laser beam having a wavelength that is visually undetectable is conducted through the water from the submerged vehicle by an optical fiber and radiated from the optical fiber at the surface of the water to the aircraft or satellite.

An advantage of the laser communications link of the present invention is that communications with a submerged vehicle may be made with an aircraft or a satellite.

Another advantage is that the transmission from the submerged vehicle has a wavelength in the near infra-red that makes detection visually or by broadband detectors unlikely.

Still another advantage is that the transmission from the submerged vehicle only requires a few watts of electrical power.

Yet another advantage is that because the transmission from the submerged vehicle is conducted by a fiber optic cable, the transmission is not scattered by the water.

Another advantage is that data communication rates from 100 MHZ to several GHz are achievable.

The features and advantages summarized above in addition to other aspects of the present invention will become more apparent from the description, presented in conjunction with the following drawing.

DESCRIPTION OF THE INVENTION

Figure 1:
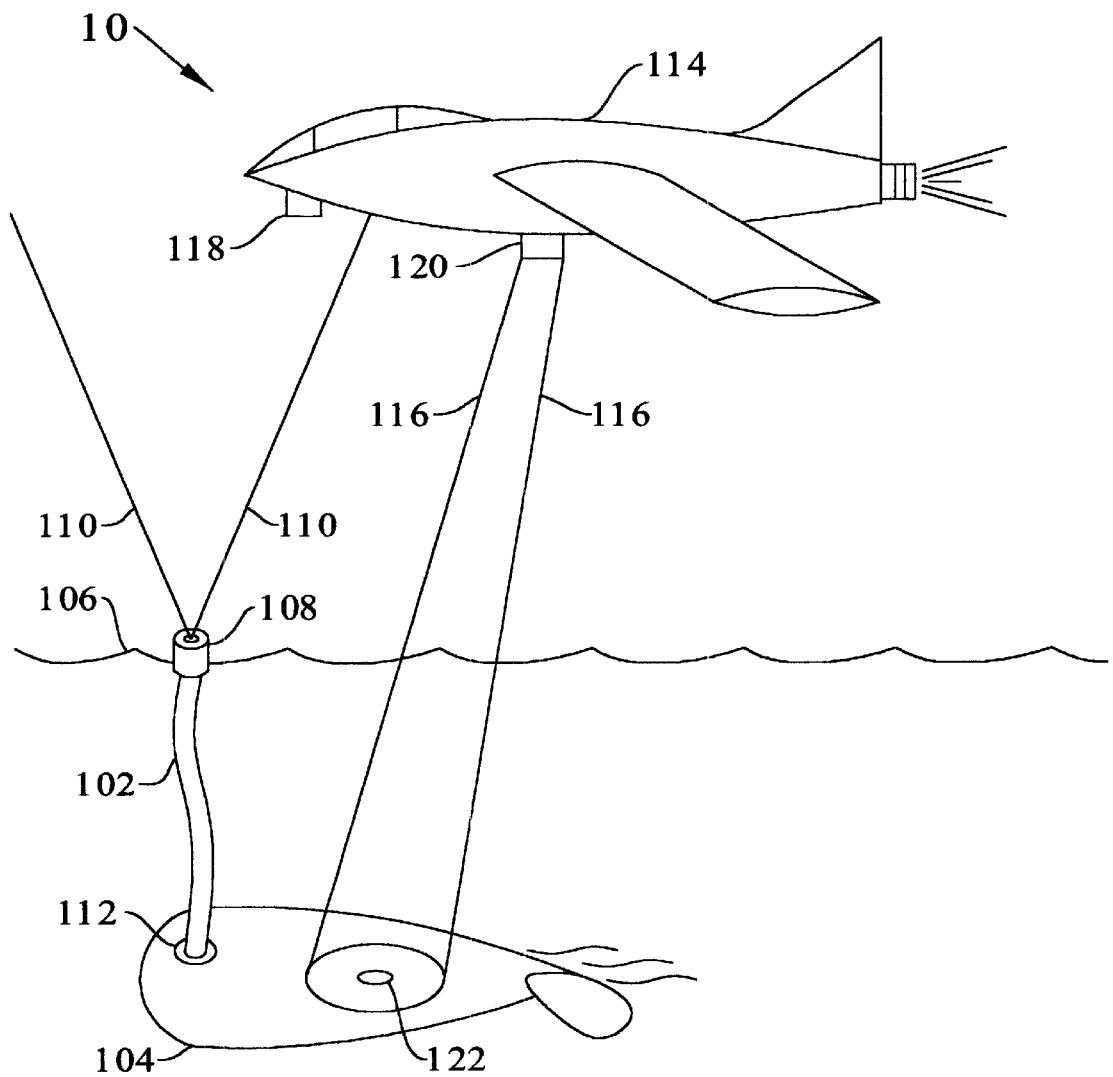
FIG. 1 is an illustration of a laser communications link of the present invention.

The following description is presented solely for the purpose of disclosing how the present invention may be made and used. The scope of the invention is defined by the claims.

FIG. 1 is an illustration of a laser communications link 10 of the present invention. A fiber optic cable 102 is spooled from a submerged vehicle 104 to water surface 106. The surface end of fiber optic cable 102 may be maintained at water surface 106 by a float 108. Float 108 is designed to keep the surface end of cable 102 pointing generally upward to aircraft 114. An uplink signal 110 radiates from a polished face on the surface end of fiber optic cable 102 in a cone-shaped pattern. No lens arrangement need be coupled to the surface end of fiber optic cable 102 to provide a suitable radiation pattern, although the polished end of fiber optic cable 102 may be polished in the shape of a lens to improve spatial characteristics of uplink signal 110. At the transmit end of fiber optic cable 102 is an uplink beam source 112, for example a near infra-red laser diode. The wavelength of uplink beam source 112 preferably has a wavelength in the near infra-red range of from about 700 nm to 2500 nm so as to be undetectable visually or by broad spectrum detection devices. A narrow-band uplink signal detector 118 receives uplink signal 110. The spectral bandwidth of signal detector 118 is matched to the emission bandwidth of uplink beam source 112 to provide high sensitivity and a high background noise rejection.

Fiber optic cable 102 and float 108 are needed only during communications with aircraft 114 and may be detached after termination of communications or spooled in for redeployment in subsequent communications.

Aircraft 114 transmits a downlink signal 116 from a downlink source 120. Aircraft 114 may be for example, a fixed wing, rotary wing or remotely piloted vehicle. Downlink source 120 may be, for example, a blue-green laser for conducting downlink signal 116 below water surface 106 to a downlink signal detector 122. Blue-green wavelengths span the range of approximately 400 nm to 550 nm. The beamwidth of downlink signal 116 may be narrowed by including a collimating lens (not shown) with downlink laser source 120. A downlink signal detector 122 receives downlink signal 116 from downlink source 120. Downlink signal detector 122 may be, for example, a photodetector with a narrow band blue-green filter.

Besides providing communications with aircraft 114, the laser communications link of the present invention may also be used to communicate with satellites.

Other modifications, variations, and applications of the present invention may be made in accordance with the above teachings other than as specifically described to practice the invention within the scope of the following claims.

I claim:

1. A communications link for a platform submerged in a body of water comprising:

an uplink signal source;

a fiber optic cable having a first end connected to the uplink signal source for conducting an uplink signal through water and a second end terminated by a polished face of the fiber optic cable for propagating the uplink signal through air;

a float connected to the second end of the fiber optic cable for keeping the second end above the water surface when the float is deployed;

an uplink signal detector for receiving the uplink signal;

a downlink signal source for transmitting a downlink signal through water;

a downlink signal detector for receiving the downlink signal; and an unmanned underwater vehicle coupled to the downlink receiver.

2. The communications link for a submerged vehicle of claim 1 wherein the downlink signal source is a laser having a wavelength within a range from about 400 nm to about 550 nm.

3. The communications link for a submerged vehicle of claim 1 wherein the uplink signal source has a wavelength within a range from about 700 nm to 2500 nm.

4. The communications link for a submerged vehicle of claim 1 further comprising a remotely piloted vehicle for receiving the uplink signal and transmitting the downlink signal.

5. The communications link for a submerged vehicle of claim 1 wherein the float and fiber optic cable are detachable from the submerged vehicle.

* * * * *